May 8, 1962  W. A. BAILEY  3,033,162
EGG COLLECTING SYSTEM
Filed Sept. 17, 1959
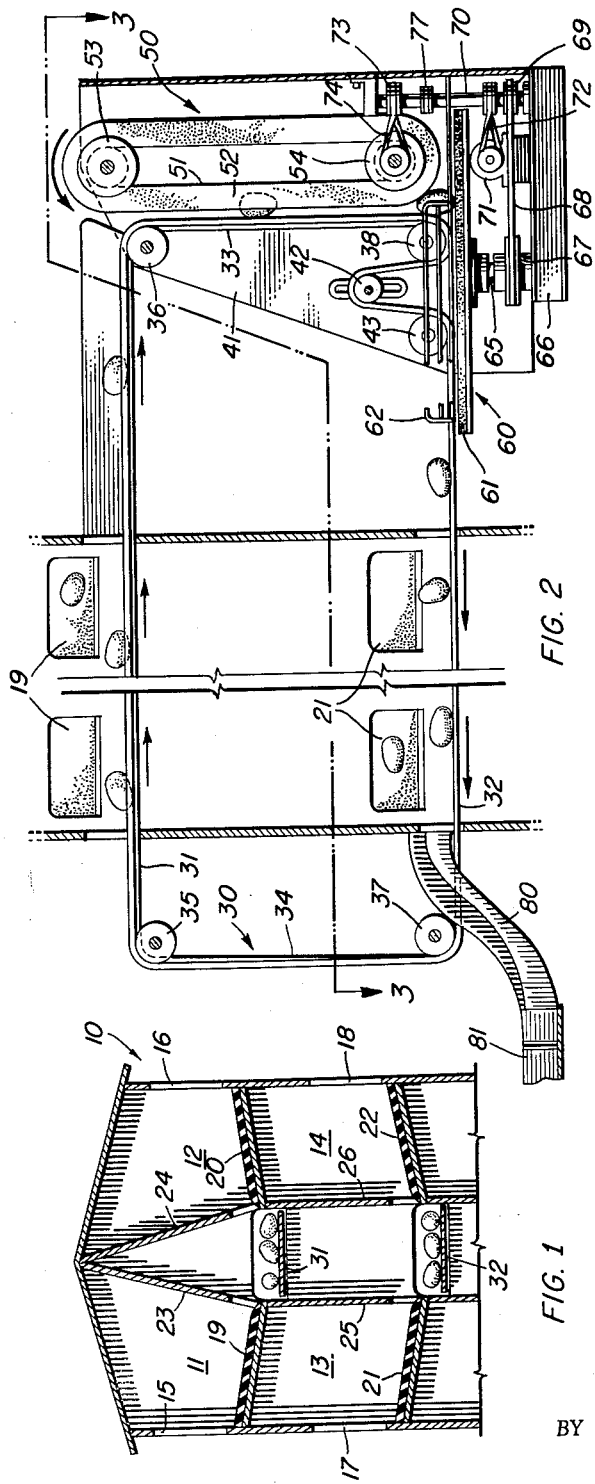
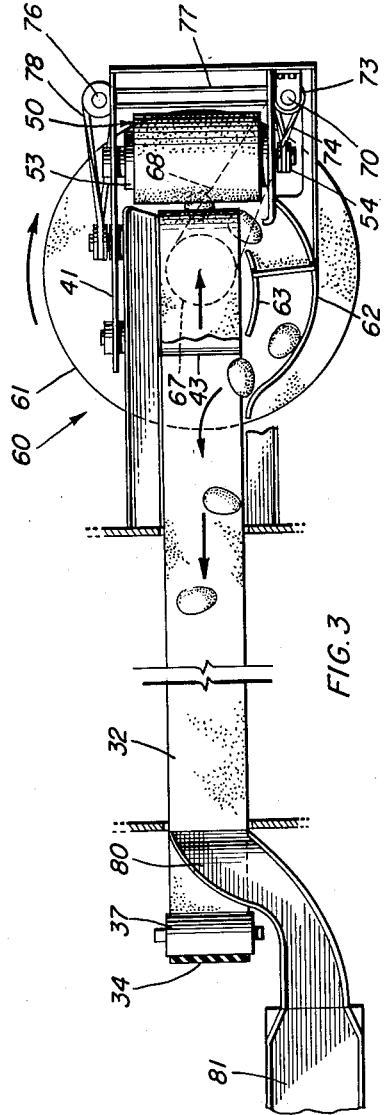
INVENTOR
William A. Bailey
BY Karl W. Flocks
ATTORNEY

United States Patent Office

3,033,162
Patented May 8, 1962

3,033,162
EGG COLLECTING SYSTEM
William A. Bailey, 6910 Furman Parkway, Riverdale, Md., assignor to himself and George B. Sweet, Montgomery County, Md., as tenants by the entirety
Filed Sept. 17, 1959, Ser. No. 840,721
11 Claims. (Cl. 119—48)

The present invention relates to an egg collecting system for poultry houses, and in particular to an egg collecting system in which a single conveyor receives eggs on the upper and lower runs thereof from the laying nests, the conveyor having a vertically disposed run in juxtaposition to which is a vertical run of a transfer belt which serves to lower eggs from the upper to the lower run.

Under the influence of rising labor and other costs, the production of eggs has been thought of in connection with mechanization, and attempts have been made to eliminate as much as possible, the utilization of man hours in egg production. This has involved automatic or mechanized egg collecting arrangements to supplant the collecting of eggs by hand.

There have been suggested, in this connection, various collector systems placed in the poultry house, which collectors receive eggs from the laying nests and convey them to a suitable point, such as an egg room at one end of the poultry house. These egg collecting systems have fallen into two categories, in one of which plural conveyor belts were used and in the other of which a single conveyor belt was used, all of these systems being adapted to the conventional poultry house arrangement in which the laying nests are arranged in four banks or batteries, there being a pair of upper oppositely disposed and spaced batteries and a pair of lower oppositely disposed and spaced batteries. Thus, the operative runs of the conveyors were arranged to receive eggs from the nests in each pair of batteries.

In this construction in which two conveyors were used, one for the upper pair of batteries, and one for the lower pair of batteries, there was found the disadvantage that two conveyors were required, as well as an excess of driving gear. In addition, in these two conveyor constructions there were found to be certain disadvantages in the mechanism utilized to transfer eggs from one level to the other.

For example, in one known construction a complicated transfer conveyor was used embodying a plurality of spoon-shaped egg receivers pivotally supported at a midpoint. Such a transfer mechanism was composed of numerous parts including a plurality of individual springs, and as a consequence was both expensive in construction and subject to mal-functioning in the event of breakage of any of the springs. In another of the known transfer mechanism, a special conveyor was utilized in which a plurality of shelf-like vanes extended outwardly from the conveyor to form intermediate pockets into which the eggs were intended to be received. Besides being expensive, this construction permitted a shelf-like vane to strike an egg being fed thereto and thus break any egg that was not being delivered to this vertical transfer mechanism in properly timed relationship therewith.

In the single conveyor category, the mechanism used to transfer eggs from one run of the conveyor to the other, from the lower run to the upper run, comprised an inclined elevating conveyor that was provided with lugs to engage the eggs. Due to the necessary inclination of this transfer conveyor, it was found necessary to provide fewer nests on the batteries, and so this construction required the utilization of relatively expensive space within the poultry house, which space was taken away from the available space for laying nests. Otherwise stated, laying nests were removed from the poultry house in order to accommodate the transfer mechanism involving the inclined transfer conveyor.

An object of the present invention is to provide an egg collecting system that is of economical construction.

Another object of the present invention is the provision of an egg collecting system that will not cause egg breakage.

Still another object of the present invention is to provide an egg collecting system that requires a minimum of space in the poultry house.

Other objects and the nature and advantages of the instant invention will be apparent from the following description taken in conjunction with the accompanying drawings, wherein:

FIG. 1 is a cross sectional view of a poultry house embodying the egg collecting system of the present invention.

FIG. 2 is an elevational view, with parts removed, of an egg collecting system in accordance with the invention.

FIG. 3 is a cross sectional view taken on the line 3—3 of FIG. 2.

Referring now to the drawings, wherein like reference numerals are used to designate like or corresponding parts throughout the several views, there is shown in FIG. 1 a poultry house 10 in which there may be seen a pair of upper oppositely disposed nests 11 and 12 and a pair of lower oppositely disposed nests 13 and 14. It will be understood that these nests are each part of the battery or bank of nests that extends along the length of the poultry house 10. Access openings 15, 16, 17 and 18 are provided into each of the nests, and the floors of the nests are sloped so that eggs laying thereon will roll downwardly. As will be observed, the floors of the nests 19, 20, 21 and 22 slope towards the center of the poultry house 10. The inside walls 23, 24, 25 and 26 of the laying nests extend to levels that are above the floors of the nests, and so eggs may roll along the floors of the nests and beneath the inner walls.

To receive and collect the eggs from the laying nests, there is provided an endless conveyor 30, conveyor 30 having an upper run 31 and a lower run 32. Upper run 31, as is clearly shown in FIGS. 1 and 2, is positioned to receive eggs from the nests of the upper batteries and lower run 32 is positioned to receive eggs from the nests of the lower batteries.

Conveyor 30 has at the ends thereof vertical runs 33 and 34, it being noted that in the embodiment illustrated the pulleys 35, 36, 37 and 38 are used to define and determine the location of the conveyor 30. These pulleys are supported in some suitable manner, pulleys 36 and 38 being carried by axles that are engaged in support plate 41. There may also be provided a belt tensioning pulley 42 carried by support plate 41 as well as a cooperating pulley 43.

An endless transfer belt 50 is generally vertically disposed, and has one run 51 thereof closely adjacent the vertical run 33 of conveyor 30. Transfer belt 50 comprises an outer layer 52 that is thick, yieldable and resilient and is, preferably, made of foam rubber. Transfer belt 50 is supported by an upper pulley 53 and a lower pulley 54, these pulleys being supported on axles which are in turn supported by support plate 41 and are positioned so that run 51 extends for substantially the same distance as run 33.

A horizontal disc 60 is rotatably supported beneath belt 50 and run 33, and is mounted so that it underlies a part of lower run 32. In practice, conveyor 30 will be a thin web, and the disc 60 will have a covering 61 of foam rubber, the upper surface of which will be in contact with or slightly spaced from the lower surface of lower run 32.

A guide 62 is positioned closely above the upper surface of the layer 61, and as may be seen in FIG. 3 extends in a generally arcuate path leading from the lower ends of vertical runs 33 and 51 to a point that is to the left of pulley 43. An inner or auxiliary guide 63 may be provided to act as an inner barrier.

Horizontal disc 60 is carried by a shaft 65 that is supported on a platform 66, shaft 65 having a pulley 67 connected to it and driven by a belt 68 from a drive pulley 69 mounted on a shaft 70. Shaft 70 is driven from the motor 71 by a belt 72, and a pulley 73 at the upper end of shaft 70 drives a belt 74 that is operatively connected to the lower pulley 54 of transfer belt 50. Shaft 70 also drives a counter shaft 76 through belt 77, and counter shaft 76 is connected to lower pulley 38 by a belt 78.

A suitable guide 80 is provided at the end of lower run 32 adjacent pulley 37 and serves to remove eggs from the lower run 32 and transfer them to a table 81 which is preferably located in an egg room at one end of the poultry house.

In operation, eggs will roll down the inclined floors of the various nests of the batteries onto the upper run 31 and lower run 32 of conveyor 30. Eggs received on upper run 31 will be moved thereby to the right, as shown in FIG. 2, and at the end of the run 31, at pulley 36 will follow conveyor 30 as it enters onto vertical run 33. Due to the proximity of run 51 of transfer belt 50 to run 33 of conveyor 30, eggs will engage both the run 33 and the run 51. Due to the yieldable and resilient nature of layer 52 of transfer belt 50, the eggs will form a pocket in the layer 52, and thus will be firmly and yieldably held in the pocket. The driving mechanism for conveyor 30 and the belt 50 will cause both of the runs 33 and 51 to move downwardly, to thereby lower the eggs held by these two runs, and these runs will move downwardly at substantially the same speed, under the control of the above described driving mechanism. When an egg reaches the bottom of the runs 33 and 51, it will be released from these runs, and will be deposited onto the soft resilient foam rubber layer 61 of horizontal disc 60.

The eggs will be received on disc 60 and will be transferred thereby onto the upper surface of lower run 32 of conveyor 30, being guided as necessary between the guides 62 and 63. The eggs thus received on the upper run 31 will be transferred gently but firmly to the upper surface of lower run 32, positively and without danger of breakage. The eggs on lower run 32 will be removed therefrom by the guide 80 and transferred thereby to the table 81.

It will be understood that the drive mechanism above described is a preferred embodiment, and other equivalent drive mechanisms may be used.

There has been provided an egg collecting system that is of economical construction, involving the utilization of a simple conveyor belt and a relatively short and economical transfer belt, together with a horizontally rotating disc and suitable driving equipment. These several parts cooperate together to utilize a minimum of space in a poultry house, thereby requiring no diminution in the number of laying nests in the poultry house. Eggs may be transferred from the upper to the lower run of the conveyor of the present invention gently and securely, and without danger of breakage to the eggs.

It will be obvious to those skilled in the art that various changes may be made without departing from the spirit of the invention and therefore the invention is not limited to what is shown in the drawings and described in the specification but only as indicated in the appended claims.

What is claimed is:

1. In a poultry house, a pair of upper oppositely disposed spaced batteries of laying nests and a pair of lower oppositely disposed spaced batteries of laying nests therebelow, an endless conveyor having an upper run positioned to receive eggs from the nests of the upper batteries and a lower run positioned to receive eggs from the nests of the lower batteries, said conveyor having a substantially vertical run at one end thereof, an endless transfer belt having one run vertically disposed and adjacent said vertical run of said conveyor, said transfer belt comprising an outer thick, yieldable and resilient layer, means for driving said conveyor and said transfer belt so that the adjacent vertical runs thereof move downwardly and at substantially the same speed, a horizontal disc rotatably mounted closely beneath said vertical runs, said disc partially underlying the lower run of said conveyor, means for rotating said disc, guide means above said disc for guiding an egg on said disc from said vertical runs to said conveyor lower run, and guide means for removing eggs from the lower run of said conveyor.

2. In a poultry house, a pair of upper oppositely disposed spaced batteries of laying nests and a pair of lower oppositely disposed spaced batteries of laying nests therebelow, an endless conveyor having an upper run positioned to receive eggs from the nests of the upper batteries and a lower run positioned to receive eggs from the nests of the lower batteries, said conveyor having a substantially vertical run at one end thereof, an endless transfer belt having one run vertically disposed and adjacent said vertical run of said conveyor, means for driving said conveyor and said transfer belt so that the adjacent vertical runs thereof move downwardly and at substantially the same speed, a horizontal disc rotatably mounted closely beneath said vertical runs, said disc partially underlying the lower run of said conveyor, means for rotating said disc, guide means above said disc for guiding an egg on said disc from said vertical runs to said conveyor lower run, and guide means for removing eggs from the lower run of said conveyor.

3. In a poultry house, a pair of upper oppositely disposed spaced batteries of laying nests and a pair of lower oppositely disposed spaced batteries of laying nests therebelow, an endless conveyor having an upper run positioned to receive eggs from the nests of the upper batteries and a lower run positioned to receive eggs from the nests of the lower batteries, said conveyor having a substantially vertical run at one end thereof, an endless transfer belt having one run vertically disposed and adjacent said vertical run of said conveyor, means for causing the adjacent vertical runs of said transfer belt and conveyor to move downwardly at substantially the same speed, a horizontal disc rotatably mounted closely beneath said vertical runs, said disc partially underlying the lower run of said conveyor, means for rotating said disc, guide means above said disc for guiding an egg on said disc from said vertical runs to said conveyor lower run, and guide means for removing eggs from the lower run of said conveyor.

4. In a poultry house, a pair of upper oppositely disposed spaced batteries of laying nests and a pair of lower oppositely disposed spaced batteries of laying nests therebelow, an endless conveyor having an upper run positioned to receive eggs from the nests of the upper batteries and a lower run positioned to receive eggs from the nests of the lower batteries, said conveyor having a substantially vertical run at one end thereof, an endless transfer belt having one run vertically disposed and adjacent said vertical run of said conveyor, means for causing the adjacent vertical runs of said transfer belt and conveyor to move downwardly at substantially the same speed, a horizontal disc rotatably mounted closely beneath said vertical runs, said disc partially underlying the lower run of said conveyor, means for rotating said disc, and guide means above said disc for guiding an egg on said disc from said vertical runs to said conveyor lower run.

5. In a poultry house, a pair of upper oppositely disposed spaced batteries of laying nests and a pair of lower oppositely disposed spaced batteries of laying nests therebelow, an endless conveyor having an upper run positioned to receive eggs from the nests of the upper batteries and a lower run positioned to receive eggs from the nests of the lower batteries, said conveyor having a substantially vertical run at one end thereof, an endless transfer belt having one run vertically disposed and adjacent said vertical run of said conveyor, means for causing the adjacent vertical runs of said transfer belt and conveyor to move downwardly at substantially the same speed, and means for transporting eggs released from between the conveyor and transfer belt at the lower ends thereof to the upper side of the lower run of said conveyor.

6. In a poultry house, an endless conveyor having an upper run adapted to receive eggs from upper nests and a lower run therebeneath adapted to receive eggs from lower nests, said conveyor having a substantially vertical run at one end thereof, an endless transfer belt having one run vertically disposed and adjacent said vertical run of said conveyor, means for causing the adjacent vertical runs of said transfer belt and conveyor to move downwardly at substantially the same speed, and means for transporting eggs released from between the conveyor and transfer belt at the lower ends thereof to the upper side of the lower run of said conveyor.

7. In a poultry house, an endless conveyor having an upper run adapted to receive eggs from upper nests and a lower run therebeneath adapted to receive eggs from lower nests, means in alignment with said runs for lowering eggs from the level of the upper run to the level of the lower run, and means for transferring eggs from said lowering means to the upper side of the lower run of the conveyor.

8. The apparatus of claim 7, said last mentioned means comprising a horizontal disc rotatably mounted closely beneath said lowering means, said disc partially underlying the lower run of said conveyor.

9. The apparatus of claim 8, and further comprising guide means above said disc for guiding an egg on said disc from said lowering means to said conveyor lower run.

10. The apparatus of claim 7, said means for lowering eggs comprising a substantially vertical run at one end of said conveyor, and an endless transfer belt having one run vertically disposed and adjacent said vertical run of said conveyor.

11. The apparatus of claim 10, said transfer belt comprising an outer thick, yieldable and resilient layer.

References Cited in the file of this patent

UNITED STATES PATENTS

| | | |
|---|---|---|
| 2,264,156 | Apple | Nov. 25, 1941 |
| 2,710,682 | Coll | June 14, 1955 |
| 2,745,379 | Schmidt | May 15, 1956 |
| 2,784,832 | Thomson | Mar. 12, 1957 |
| 2,886,173 | Scott | May 12, 1959 |
| 2,968,385 | Harkey | Jan. 17, 1961 |
| 2,987,038 | Cole | June 6, 1961 |